Dec. 2, 1924.

G. MARTIN 1,517,244

METHOD OF BUILDING CONSTRUCTION

Filed Oct. 12 1922

INVENTOR:
George Martin,
BY Chas. M. C. Chapman,
ATTORNEY.

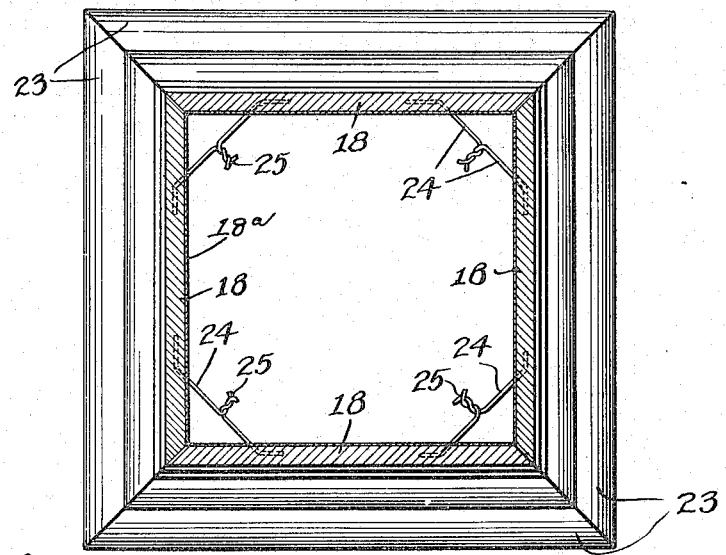
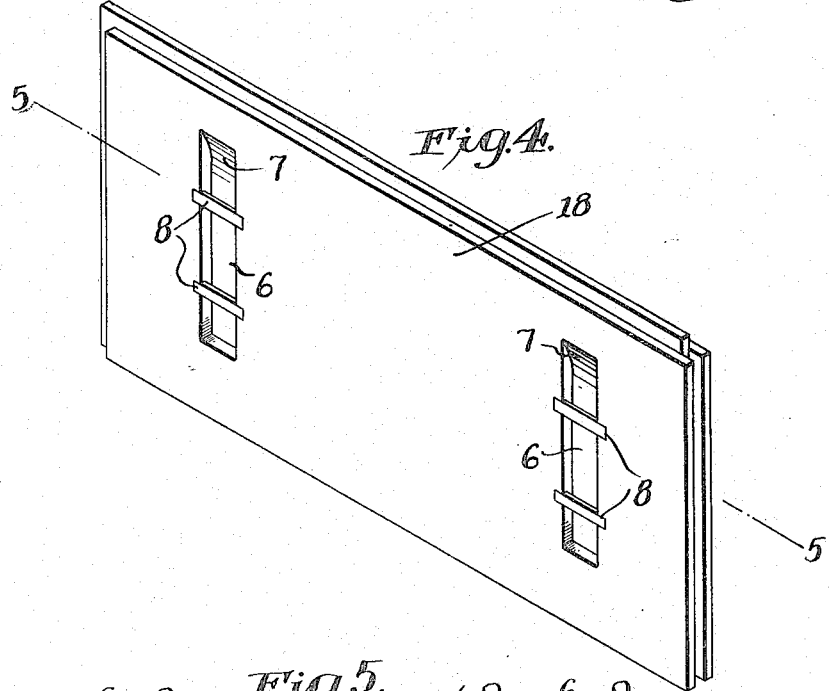
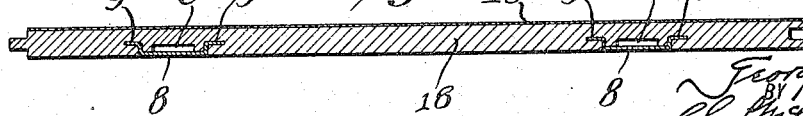

Dec. 2, 1924.                                                    1,517,244
G. MARTIN
METHOD OF BUILDING CONSTRUCTION
Filed Oct. 12 1922                          3 Sheets-Sheet 3
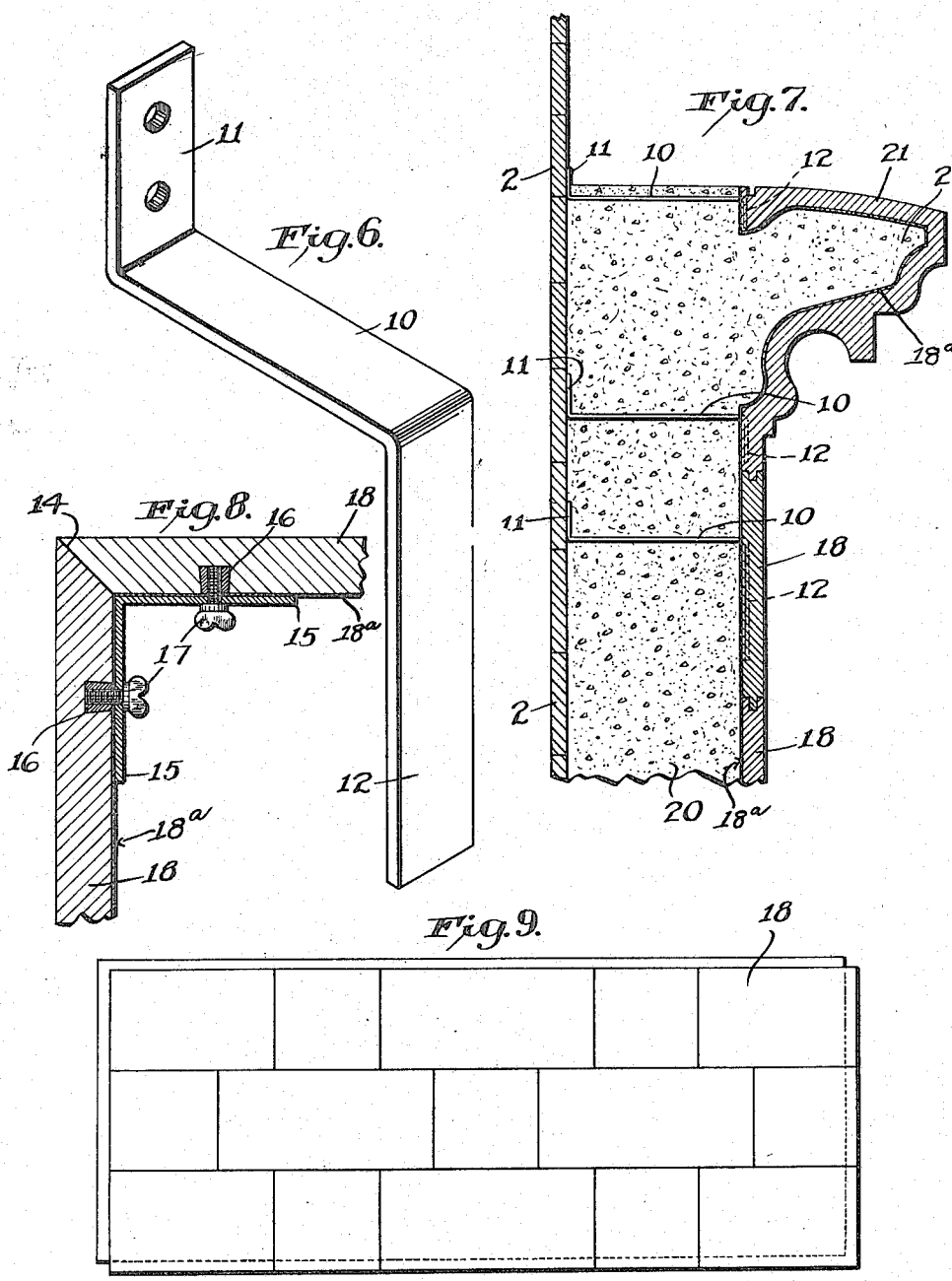
INVENTOR:
George Martin
By Chas. M.C. Chapman,
ATTORNEY.

Patented Dec. 2, 1924.

1,517,244

UNITED STATES PATENT OFFICE.

GEORGE MARTIN, OF BROOKLYN, NEW YORK, ASSIGNOR OF ONE-HALF TO JOHN J. SULLIVAN, OF NEW YORK, N. Y.

METHOD OF BUILDING CONSTRUCTION.

Application filed October 12, 1922. Serial No. 594,180.

*To all whom it may concern:*

Be it known that I, GEORGE MARTIN, a citizen of the United States, residing in the borough of Brooklyn, county of Kings, and State of New York, have invented a new and useful Improvement in Methods of Building Construction, of which the following is a description.

This invention has reference to the art of fabricating structures of cement and tiles, or slabs, panels, etc., the cement being so composed as to be susceptible of pouring, if desired, as distinguished from being shoveled or plastered, and which will rapidly harden or set during the process of construction or shortly after a given operation is completed. Particularly, the invention relates to the method of fabricating buildings and structures of various types such as dwellings, stores, storage warehouses, walls, columns, shafts, etc.

Among the objects of my invention may be noted the following: to provide a method of building cement structures which eliminates the necessity for the construction of doorways, windows and other openings in the "forms" or "molds" employed, and according to which method such doorways, windows and other openings can be readily located, and worked into the fabric or structure quickly, easily and effectively; to provide a method by which the panels or slabs of a predetermined structure are primarily utilized as a part of the "form" or "mold" and can be quickly set up, temporarily anchored, and the anchoring means and slabs or panels left in the structure as a permanent part of the latter, thus adding strength and durability to the fabric or structure and overcoming any possibility of the slabs or facings being displaced, distorted in place, or caused to loosen or produce defects in the structure in any manner; to provide a method by which cement structures such as dwellings, apartments, warehouses, garages, walls, shafts, etc., can be erected quickly, economically and of great strength, with facing slabs, panels or tilings, which latter obviate the necessity of facing the cement walls with coats of added material for finish, ornamentation or for other purposes; and to provide a method of constructing buildings including the parts thereof, such as the outer walls, partitions, windows, doors, shafts, chimneys, columns, etc., readily, uniformly, economically and with great facility.

With the above objects in view and others which will be detailed during the course of this description my invention consists in the method of construction and in the implements, features and elements and combinations thereof employed in and as a part of said method, all as hereinafter described and claimed.

In order that my invention may be clearly understood, I have provided drawings wherein:

Figure 3 is a horizontal section of a column such as a shaft, chimney, etc., embodying my invention;

Figure 4 is a perspective view of the slab, panel or tiling employed in my method and embodying features of my invention;

Figure 5 is a longitudinal section of my slab taken substantially on the line 5—5 of Figure 4;

Figure 6 is an enlarged perspective view of one of the anchoring devices employed in my method of construction;

Figure 7 is a vertical section of a portion of a building wall showing the mode of ornamenting, as by a cornice, the top thereof and showing also the method of holding the cornice in place;

Figure 8 is a horizontal section of a corner or angle of a structure made in accordance with my invention, showing mitering and the mode of holding the mitered parts together; and Figure 9 is a face view of the slab or panel made according to my invention and showing a mode in which the face of the slab may be ornamented or made to represent bricks or stones laid one upon the other in usual manner.

Primarily it should be understood that in building cement structures it is usual to prepare duplex walls which become a form or mold for holding the cement after it is poured or filled in; and, in cement structures, as usually made, the forms are arranged with a generous intermediate space, according to building regulations, and the cement is poured in the forms and allowed to solidify after being tamped, if required. It has also been proposed to build a whole house at one time by setting up the wooden forms in the general shape of the house and pouring the cement into the forms; and it has also been proposed to build such houses floor-by-floor. These structures and modes of operation require an immense amount of lumber which is very expensive and which is usually wasted, destroyed and cannot, in great measure, be re-used or utilized in subsequent building operations. According to my invention, however, I eliminate one-half the lumber usually used, do not waste or destroy the lumber, and am enabled to provide a facing and finish for the structure, simultaneously with the building of the latter, thus facilitating the construction of a predetermined building and materially reducing the cost thereof.

Figure 1:
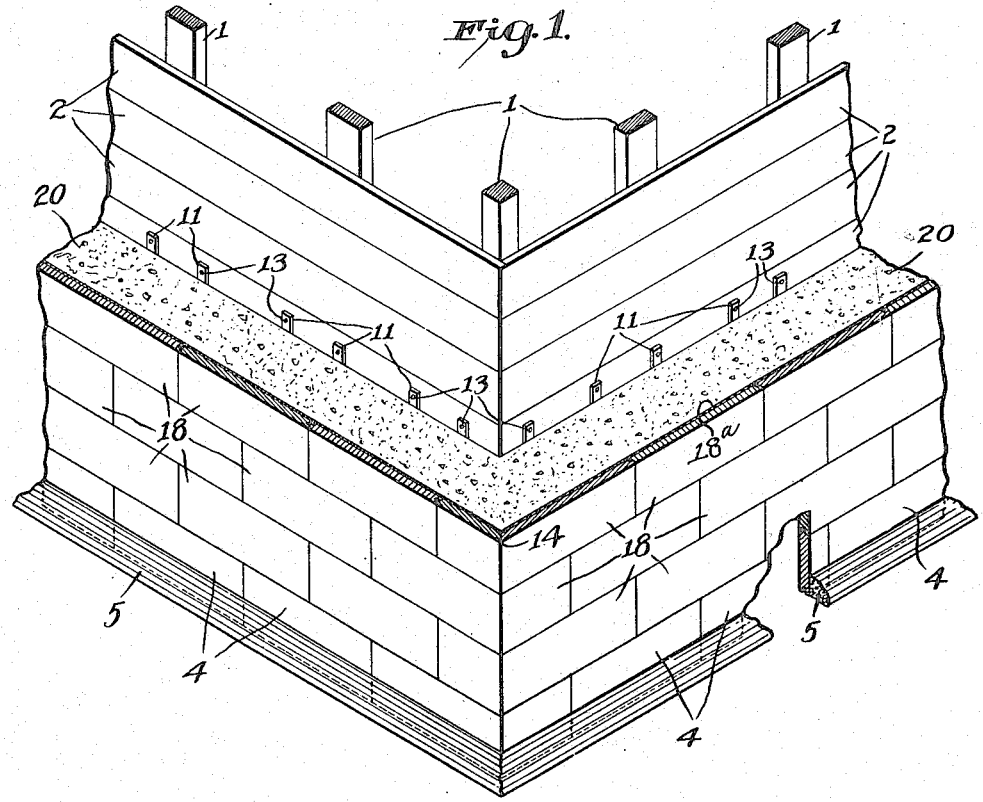
Figure 1 is a perspective view of a portion of a building undergoing construction and embodying my method and some of the implements and devices employed therein.
Figure 2:
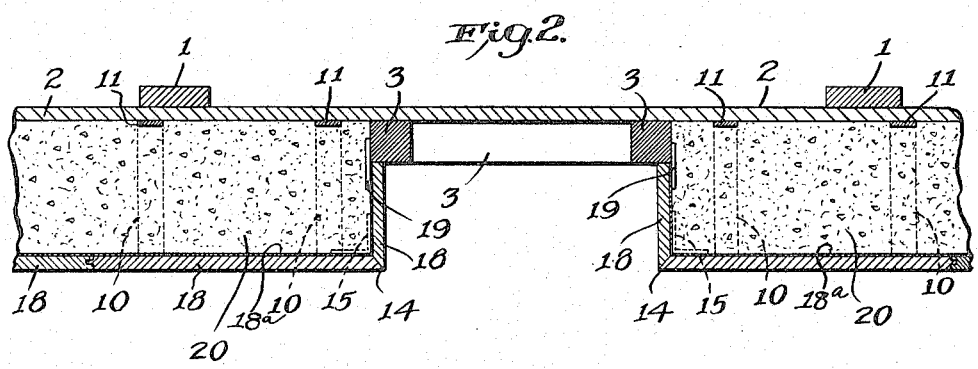
Figure 2 is a horizontal section of any part of a structure such as shown in Figure 1, the view being taken, however, at a window opening.

Figures 1 and 2 are sufficiently in detail to show my method of construction. Therein the numeral 1 indicates a plurality of uprights to which the boards 2 are nailed, and which structure may be braced in any well known or usual manner, so as to make the same sufficiently solid to retain the cement properly while it is solidifying. According to my invention, and this is one of its important features, the form or background thus made is continuous throughout and devoid of any breaks or openings such as are required for doors, windows or other openings or apertures in the structure. This means that the mold, form or background can be composed of straight lumber without regard to length or width and without the necessity of cutting, fitting or any special preparation and that it can be erected with great rapidity and given unusual strength. The rapidity with which the structure can be erected and the mode of producing the mold or background make for economy in cost, time and material. As shown in Figure 2, wherever a window-frame or door-frame or the frame of any other opening is required in the finished structure, said frame is fastened in place upon the outer face of the background, the side and sill members of such a frame being indicated at 3. Thus every window and door-frame and the frame of every other opening for the finished structure is nailed or applied and fastened in place directly upon the face of the form or background. This makes for facility and economy of construction and also enables all the opening frames to be set in place before the cement is poured and before the facing slabs are erected, thus enabling the workmen to lay out the plan of the wall structure and determine with great accuracy the proper positions for such frames. Then, too, by this method of operation, it is not necessary to cut, and thus weaken, the wood form or background for the various openings, such as doors or windows, and the slabs or facing panels can be readily built up to the frames, thus saving labor, time and material. Moreover, by thus applying such frames to the form or background, the latter is materially strengthened, enabling the form to be erected with less verticals and strengthening members.

The next step in the method of construction is to set up the first course of slabs, facings or panels 4, the foundation having been previously properly prepared, or made level and smooth in any usual manner. In setting up this first course of slabs 4, anchoring devices 10 are applied, as presently described in detail with reference to Figure 6. Next cement 5 is applied to the base of the first course of slabs 4 and to the foundation adjacent the base of the slabs, the cement being piled up an inch or two or to a point sufficient to reinforce and stabilize the base of the first course of slabs and prevent them from being forced outwardly when the filling is poured or laid in.

The next step in the method of construction is to build or set up course after course of the slabs and anchor them in place with the means presently described, this step involving incidental operations such as mitering the ends of slabs occurring at angles of the building, using certain angle-pieces for holding the mitered slabs together, and stay bars or pieces for holding certain slabs to the side members of the window or door-frames. Thus the mold, or hollow form is produced consisting of the temporary background 2, and the permanent facing composed of courses of slabs 4 and 18.

Next, the concrete, cement or other filling is poured or laid in the space between the background or facing slabs.

When a sufficient height of structure has been produced, it may be topped off with an ornamental course or cornice, as shown in Figure 7, the same being anchored in place as above described with reference to the courses of slabs. The ornamental members are usually hollow and the concrete or cement is filled into the hollow portions so as to form a solid, homogeneous mass with the wall filling and constitute an anchorage between the cornice and wall of great strength.

The foregoing are the several important and principal steps of my method; but, it will be understood that there are incidental steps employed in carrying out my method which will be described in connection with the structural features of the devices and implements used.

Each of the slabs, as shown in Figure 4, is provided with anchorage means, this being a feature of my invention and shown to consist of a comparatively deep imperforate slot, extensive as required, made in the inner surface of the slab and shown as extending from near the top to near the bottom and located near the ends of the slab. The slots 6 are long and narrow and at their upper ends the bottom surface thereof is gradually brought to the surface of the slab, as indicated at 7, thus giving the top ends of the slots a beveled or inclined surface. Transverse anchorage loops 8 are embedded in the inner surface of the slabs during the process of molding them, and are caused to bridge or extend across the slots 6 transversely near the top and bottom thereof; and said anchorage loops are so embedded as to have their outer surface flush with the surface of the slabs. In order to retain the anchorage loops strongly in position, they are provided with angular extensions 9 deeply embedded in the body of the slabs, as shown in the section of Figure 5. Preferably, each slot 6 is bridged by a pair of anchorage loops 8, as shown in Figures 4 and 5. The anchorage loops are engaged by angular anchors or supporting means indicated in enlarged perspective in Figure 6, the same consisting of a body portion 10, which is horizontal when in operative position, a member 11 which is at a right-angle to member 10, and a member 12 which is adapted to enter a slot 6 behind the anchorage loops 8, said member being at a right-angle to member 10 and extended oppositely to member 11. The slots 6 in the slabs and the member 12 of the anchors may be of any desired length, the length shown being merely for illustration and not for limitation. The member 11 is provided with a plurality of apertures 13 by which the anchors may be nailed to the back support or form 2, as indicated at 13 in Figure 1. Thus when the slab is set in place, the anchors can be slipped into the slots 6 behind the loops 8 and the members 11 then nailed to the back form-structure 2.

The slabs are preferably tongued and grooved all around their edges, thus enabling tight joints to be made for holding the filling of cement or concrete. The slabs on their inner surfaces are preferably coated with any suitable damp-proof material 18ª, thus making it possible to finish interior walls with one coat of hard plaster. This does away with furring, lathing and a coat of brown mortar, making for saving of labor, money and time. It is to be understood by this that, although I have shown in Figure 1 an outside wall structure, such structure may be an inside wall, as all the rooms of the building. In this event the wall-framing is the background or form, to which the anchorage members are nailed, and becomes a permanent part of the structure. The slabs can also be used to veneer or cover the outside of a frame building, doing away with frequent painting. A brick building may also have its outer walls covered with the slabs, thus doing away with furring and lathing. This will also render a brick wall damp-proof.

At angles or corners, as shown in Figures 1 and 2, the slabs are cut in a miter box and their slabbed or beveled ends placed together, as at 14, thus making a neat finish and a perfect angle without overlapping. Moreover, this makes the surface of the wall at the angle look like solid stone or brick, and especially when the slabs are made to imitate laid stone or brick, as shown in Figure 9. At such angles as 14, Figures 1 and 2, anchorage is made through the medium of an anchor-bracket member having arms 15 at a right-angle to each other, the same being placed, as shown in Figure 8, against the inner surface of the slabs at the angle, and being held in place by expansion shields 16, of usual construction, set in apertures in the inner surface of the slabs and the members of which shields are held by thumb-screws 17. Thus the corners of the walls and angles at window and door frames are perfectly formed and strongly and properly held.

According to my method, the slabs 18 are set up one upon the other, the tongues entering the grooves of adjacent slabs and the latter being thus interlocked along their edges and ends, as will be readily understood upon reference to Figures 1 and 2. When a window-frame or door-frame is reached, the slabs are properly mitered and fitted and anchored so as to engage and cooperate properly with the frame members 3, anchorage means 15 being employed as previously stated, and other anchoring means 19, in the form of straight bars, being employed to hold the side slabs and side members of the frame in proper juxtaposition, expansion shields and screws being used also for this purpose. When a sufficient number of courses of slabs are built up, the cement or concrete 20 is filled in between the form 2 and slabs 4 and 18 and allowed to set.

When the top of the wall structure is reached an ornamental cornice 21 may be applied, the same being made hollow, as at 22, so as to receive the cement which thus anchors the cornice to the vertical cement wall, the cornice also being anchored by the devices 10 and properly held by the tongue and groove construction of the cornice and adjacent slabs.

Columns, chimneys, etc., can be built as shown in Figure 3, wherein at the foundation an ornamental or base slab 23 is first placed in position, upon which are set series of slabs 18 to the desired extent and these may be topped off with an ornamental cornice, such as shown in Figure 7. The slabs 18 may be sufficiently long for the sides of the column, as shown in Figure 3, in which case the ends will be mitered and anchored together in a manner similar to that shown in Figure 8, or through the medium of wires 24, which may have one end embedded in the slab similarly to the structure shown in Figure 5, and, when the slabs are arranged in proper cooperative relation, as shown in Figure 3, the wires may be twisted together, as at 25, until the slabs are brought into firm contact. The column may be left hollow, as shown in Figure 3, for ventilation or other purposes, or it may be filled in with cement in the event a solid column is desired, in which case the anchoring means 24—25 will be embedded in the cement the same as in Figures 1 and 2.

From the foregoing description it will be seen that I have provided a novel, simple and economical method of constructing buildings, walls, etc., which requires only one lumber form or background, and which latter can be readily knocked down when the cement is properly set, thus leaving a solid structure of cement, anchorage means and window and door-frames all in permanent position and relation. It will be apparent that facility and economy of construction are provided for, and that the advantages are all present, as herein set forth.

Having thus described my invention, what I claim and desire to secure by Letters Patent is:

1. The method of fabricating structures comprising forming a temporary continuous background of ordinary boards; applying to said background permanent frames suitable for windows and doors in the finished structure; setting up a course of permanent base slabs in spaced relation to the background; reinforcing the base of said course of slabs; setting up a plurality of courses of permanent slabs above said first course and in spaced relation to the background; filling the space between the background and slabs with a suitable composition; and removing the background but leaving the frames set in the filling composition.

2. The method of fabricating structures comprising forming a temporary continuous background of ordinary boards; applying to said background suitable permanent frames; setting up a course of permanent base slabs in spaced relation to the background; setting up a plurality of courses of permanent slabs above said first course and in spaced relation to the background; filling the space between the background and slabs with a suitable composition; setting up and anchoring a permanent cornice upon the top course of slabs; and removing the background but leaving the frames set in the filling composition.

3. The method of fabricating structures comprising forming a temporary continuous background; applying to said background suitable permanent frames; setting up a course of permanent slabs in spaced relation to the background; anchoring said slabs to the background by means becoming part of the finished structure; setting up a plurality of courses of permanent slabs above the first course and in spaced relation to the background; anchoring said courses to the background by means becoming part of the finished structure; filling the space between the background and slabs with a suitable composition; and removing the background but leaving the frames set in the filling composition.

4. The method of fabricating structures comprising forming a temporary continuous background; applying to said background suitable permanent frames; setting up a course of permanent base slabs in spaced relation to the background; setting up a plurality of courses of permanent slabs above said first course and in spaced relation to the background; mitering the slabs at all angles and anchoring the mitered ends together; filling the space between the background and slabs with a suitable composition; and removing the background but leaving the frames set in the filling composition.

5. The method of constructing buildings consisting in first erecting a continuous background of cheap materials; then securing temporarily to said background frames suitable for doors and windows in the finished structure; then setting up in spaced relation to the background a course of slabs to form the base of the facing in the finished structure; then erecting upon the base a plurality of courses of facing slabs; then filling the space between the background and slabs with a suitable composition; and then dismantling the background leaving the frames incased permanently in the filling.

6. The method of constructing buildings consisting in first erecting a continuous background of cheap materials; then securing temporarily to said background frames suitable for doors and windows in the finished structure; then setting up in spaced relation to the background a course of slabs to form the base of the facing in the finished structure; reinforcing said course of slabs at their base on the outside; then erecting upon the base a plurality of courses of facing slabs; then filling the space between the background and slabs with a suitable composition; and then dismantling the background leaving the frames incased permanently in the filling.

7. The method of constructing buildings consisting in erecting a temporary continuous background of cheap materials; securing temporarily to said background frames suitable for doors and windows in the finished structure; setting up in succession a plurality of courses of slabs, one course upon another, all adapted to provide a facing for the finished structure; anchoring said courses of slabs to said background by spacing means becoming part of the finished structure; filling the space between the background and slabs with a suitable composition; and dismantling the background leaving the frames and anchoring means permanently incased in the filling.

GEORGE MARTIN.